United States Patent [19]

Braden et al.

[11] Patent Number: 5,084,510
[45] Date of Patent: Jan. 28, 1992

[54] VINYL HALIDE POLYMERS MODIFIED WITH OLEFINIC NITRILE POLYMERS

[75] Inventors: Thomas C. Braden, Wellington; Sally A. Kline, Hudson; Scott Perry, Avon Lake, all of Ohio

[73] Assignee: The B.F. Goodrich Company, Akron, Ohio

[21] Appl. No.: 428,571

[22] Filed: Oct. 30, 1989

[51] Int. Cl.⁵ .................... C08L 27/06; C08L 33/20
[52] U.S. Cl. ...................... 525/66; 525/64; 525/71; 525/84; 525/85; 525/94; 525/125; 525/129; 525/153; 525/166; 525/169; 525/179; 525/227; 525/228; 525/230; 525/239; 525/933
[58] Field of Search ............. 525/66, 84, 125, 129, 525/71, 85, 227, 228, 230, 239, 64, 94, 153, 166, 169, 179

[56] References Cited

U.S. PATENT DOCUMENTS

| | | | |
|---|---|---|---|
| 3,283,031 | 11/1966 | Greene | 525/129 |
| 3,426,102 | 2/1969 | Solak | 525/310 |
| 3,586,737 | 6/1971 | Duke | 525/310 |
| 3,644,577 | 2/1972 | Lee et al. | 525/71 |
| 3,678,129 | 7/1972 | Fischer | 525/129 |
| 3,686,363 | 8/1972 | Yu | 525/227 |
| 3,832,335 | 8/1974 | Bayer | 526/343 |
| 3,891,722 | 6/1975 | Miloscia | 525/261 |
| 3,974,239 | 8/1976 | Griffith | 525/308 |
| 4,003,963 | 1/1977 | Creasy | 525/57 |
| 4,309,465 | 1/1982 | Kornbaum | 525/57 |
| 4,728,677 | 3/1988 | Lacatus | 524/529 |
| 4,748,218 | 5/1988 | Sharaby | 524/567 |
| 4,751,118 | 6/1988 | Wypart | 524/400 |

FOREIGN PATENT DOCUMENTS 1279745  6/1972  United Kingdom .

OTHER PUBLICATIONS

H. O. Roppel, Ettlingen, Improving the Barrier Properties in Blow Moulding, Translated from Junststoffe 77 (1987) 5, pp. 485/492.

Primary Examiner—Ana L. Carrillo
Assistant Examiner—David Buttner
Attorney, Agent, or Firm—Joe A. Powell

[57] ABSTRACT

Vinyl halide polymer compositions exhibiting reduced gas permeability are described which comprise a mixture of
(a) at least one vinyl halide polymer; and
(B) from about 1 to about 40 parts by weight per 100 parts of vinyl halide polymer (A) of at least one olefinic nitrile polymer.

The vinyl halide polymers preferably are vinyl chloride homopolymers and copolymers, and the olefinic nitrile polymers are copolymers of an olefinically unsaturated nitrile such as acrylonitrile and one or more monomers from the group of conjugated dienes, monoolefins, olefinically unsaturated carboxylic acid esters, and vinyl aromatic compounds. The olefinic nitrile polymer can be chosen or manufactured to have a refractive index which is similar to the refractive index of the vinyl halide polymer thereby resulting in a more transparent composition.

10 Claims, No Drawings

VINYL HALIDE POLYMERS MODIFIED WITH OLEFINIC NITRILE POLYMERS

FIELD OF THE INVENTION

This invention relates to vinyl halide polymer compositions modified with olefinic nitrile polymers, and more particularly, to vinyl halide polymer compositions modified with olefinic nitrile polymers and exhibiting reduced gas permeability. The vinyl halide compositions comprise a mixture of at least one vinyl halide polymer and at least one olefinic nitrile polymer. The invention also relates to films, sheets and hollow articles fabricated from the vinyl halide compositions.

BACKGROUND OF THE INVENTION

Polyvinyl chloride (PVC) compositions are commonly used as packaging materials for cosmetics, pharmaceuticals, foods and health care products. Polyvinyl chloride is preferentially selected for these packaging applications due to its low cost, clarity and ease of processing. In some packaging applications it is very desirable that plastic materials exhibit a very high gas impermeability. The gas barrier properties of PVC compositions are adequate for some applications but require improvement for the protection of extremely oxygen-sensitive materials.

The gas barrier properties of PVC may be improved by chemical or physical modification, or by the addition of a filler or a protective coating. A preferred approach to improving the gas barrier properties of PVC is by blending with barrier materials. Blends in general do not always have the additive properties of the two components. The properties of the blend in many instances are worse than the properties of the pure components. Therefore, blending a barrier polymer with PVC polymers does not necessarily lead to a composite with improved gas impermeability relative to PVC. This invention describes the blending of olefinic nitrile barrier polymers with vinyl halide polymers to produce a blend whose barrier properties are additive.

The olefinic nitrile polymers themselves are used to form films and containers which are characterized as having improved oxygen and carbon dioxide gas barrier properties. These high nitrile compositions are available from a variety of sources and are described in various patents. For example, U.S. Pat. No. 3,974,239 describes impact-resistant polymers which have low permeability to gases and vapors. The polymers are prepared by polymerizing an olefinic nitrile such as acrylonitrile with an acrylic ester and a conjugated diene which may be either butadiene or isoprene. These compositions are reported to be improvements over the compositions obtained by the process described in U.S. Pat. Nos. 3,426,102 and 3,586,737 which describe the preparation of impact-resistant vapor and gas barrier resins composed of an olefinic nitrile such as acrylonitrile, optionally an acrylic ester, and a preformed diene rubber wherein the preformed diene rubber is present during the resin polymerization reaction.

U.S. Pat. No. 3,891,722 describes impact-resistant polymers having low permeability to gases and vapors which are obtained by polymerizing an olefinic nitrile such as acrylonitrile, an olefinic ester such as ethyl acrylate or a monoolefin such as isobutylene in the presence of a diene rubber. These compositions contain at least 50% by weight of the olefinic nitrile.

U.S. Pat. No. 4,003,963 describes vinyl chloride polymer barrier packaging compositions which are blends of vinyl chloride polymers containing no carboxyl groups and about 20 to 30% by weight of an ethylene-vinyl alcohol copolymer containing greater than 50 mole percent of vinyl alcohol. The compositions are reported to have enhanced resistance to gas permeability and moisture vapor transmission.

British Patent No. 1,279,745 also describes polymeric compositions which have low permeability to gases and which are impact-resistant. The compositions described in the British patent are composed of a conjugated diene monomer, an olefinic nitrile and, optionally, an ester of an olefinically unsaturated carboxylic acid or a monoolefin.

Commercially available "high nitrile" compositions having improved gas barrier properties are available from, for example, BP Chemicals International, Specialties Division, under the general trade designations "BAREX®210" and "BAREX-218". BAREX-210 is believed to be a polymeric material composed of approximately 90% of a copolymer of about 70% acrylonitrile and 30% methyl acrylate, and 10% of butadiene. Barex 218 is composed of 82% of the copolymer and 18% Of butadiene.

Nitrile barrier polymers obtained by interpolymerization of a mixture of acrylonitrile, vinylidene chloride and acrylate monomers are described in U.S. Pat. No. 3,832,335. The polymers are reported to be useful in preparing films and containers having improved oxygen barrier properties.

Although compositions of the types described above exhibit reduced gas permeability, there continues to be a need for polyvinyl chloride (PVC) compositions having even lower gas permeability and/or polyvinyl chloride compositions having low permeabilities to not one but a number of different gases. However, it often occurs that the compositions being combined with the PVC are incompatible which may result in a hazy or non-transparent composition, or in a composite which when extruded delaminates due to a lack of mechanical integrity of the composition. Also, if the polymers being mixed are incompatible, extrusion of such incompatible polymers often results in the manufacture of a product having a non-homogeneous structure which may or may not exhibit mechanical integrity.

U.S. Pat. No. 4,309,465 describes a process for preparing compositions of thermoplastic materials which are at least partially incompatible. In one example, the extruded thermoplastic composition comprises a continuous phase consisting essentially of polyvinylchloride and a discontinuous phase consisting essentially of polyvinyl alcohol. The compositions are reported to have increased gas impermeability.

SUMMARY OF THE INVENTION

Vinyl halide polymer compositions exhibiting reduced gas permeability are described which comprise a mixture of (A) at least one vinyl halide polymer; and
(B) from about 1 to about 40 parts by weight per 100 parts of vinyl halide polymer (A) of at least one olefinic nitrile polymer.

The vinyl halide polymers preferably are vinyl chloride homopolymers and copolymers, and the olefinic nitrile polymers are copolymers of an olefinically unsaturated nitrile such as acrylonitrile and one or more monomers from the group of conjugated dienes, monoolefins, olefinically unsaturated carboxylic acid esters, and vinyl aromatic compounds. The olefinic nitrile polymer can be chosen or manufactured to have a refractive index which is similar to the refractive index of the vinyl halide polymer thereby resulting in a more transparent composition.

DESCRIPTION OF THE PREFERRED EMBODIMENTS

(A) The Vinyl Halide Polymers

The vinyl halide polymers which are utilized in preparation of the improved polymer compositions of the present invention include the homopolymers and copolymers of vinyl halides including, for example, vinyl chloride and vinyl bromide. The vinyl halides may be copolymerized with each other or each of them may be copolymerized with one or more polymerizable olefinic monomers having at least one terminal $CH_2=C<$ grouping. As examples of such olefinic monomers, there may be mentioned the alpha, beta-olefinically unsaturated carboxylic acids such as acrylic acid, methacrylic acid, ethacrylic acid, alpha-cyanoacrylic acid, etc.; esters of acrylic acid such as methylacrylate, ethylacrylate, butylacrylate, octylacrylate, cyanoethylacrylate, etc.; esters of methacrylic acid such as methylmethacrylate, butylmethacrylate, etc.; nitrile such as acrylonitrile, methacrylonitrile, etc.; acrylamides such as methylacrylamide, N-methylol acrylamide, N-butoxy methylacrylamide, etc.; vinyl ethers such as ethyl vinyl ether, chloroethyl vinyl ether, etc.; the vinyl ketones; styrene and styrene derivatives such as methyl styrene, vinyl toluene, chlorostyrene, etc.; vinyl naphthalene; esters such as allyl or vinyl chloroacetate, vinyl acetate, etc.; vinyl pyridene; methyl vinyl k®tone; the diolefins, including butadiene, isoprene, chloroprene, etc.; and other polymerizable olefinic monomers of the types known to those skilled in the art.

The vinyl halide polymers particularly useful in the present invention as component (A) are homopolymers and copolymers made by the polymerization of vinyl chloride alone or in admixture with one or more polymerizable olefinic monomers copolymerizable therewith in amounts up to about 20% by weight based on the weight of the monomer mixtures. Copolymers may sometimes have a tendency to decrease the clarity of the vinyl halide polymer composition and, therefore, their amount should be minimized. The most preferred vinyl polymer, or resin, is polyvinylchloride (PVC) homopolymer produced by mass polymerization or suspension polymerization. In order to simplify the discussion and to minimize the examples used to illustrate the invention, the invention generally will hereinafter be described in connection with PVC, it being understood that this is merely intended to be illustrative and not limiting.

The preparation of vinyl halide polymers, and particularly, polyvinylchloride polymers including homopolymers and copolymers, is well known in the art. Examples of patents describing polyvinyl halides and the preparation of polyvinyl halides include U.S. Pat. Nos. 4,751,118, 4,748,218 and 4,728,677. Vinyl halide polymers and copolymers, and in particular polyvinylchloride homopolymers and copolymers are available commercially such as, from the B.F. Goodrich Company, Akron, Ohio under the general trade designation Geon.

(B) The Olefinic Nitrile Polymers

The second component utilized in the vinyl halide polymer compositions of the present invention is at least one olefinic nitrile polymer, and the olefinic nitrile polymer generally is present in amounts of from about 1 to about 40 parts by weight per 100 parts of vinyl halide polymer (A). The olefinic nitrile polymer generally is a copolymer which may be, and generally is, of the class referred to in the art as a "high nitrile" polymer which contains generally at least about 50% by weight of at least one olefinic nitrile monomer. Therefore, in one embodiment, the olefinic nitrile polymer is a copolymer of from about 50% to about 99% by weight of an olefinically unsaturated nitrile and from about 1% to about 50% by weight of one or more monomers from the group of conjugated dienes, monoolefins, olefinically unsaturated carboxylic acid esters, and vinyl aromatic compounds. Generally, the copolymers will contain at least about 60% of an olefinically unsaturated nitrile, and in other embodiments, at least about 70%. Most often, the copolymers will comprise at least about 50% by weight of an olefinically unsaturated nitrile and from about 1% to about 50% by weight of two or more of the monomers specified above.

The olefinically unsaturated nitriles useful in preparing the olefinic nitrile polymers may be characterized by the formula

$$CH_2=C(R)-CN \qquad (I)$$

wherein R represents hydrogen, a lower alkyl group containing from 1 to about 4 carbon atoms or a halogen atom. Specific examples of nitriles represented by Formula I include acrylonitrile, alpha-chloroacrylonitrile, alpha-fluoroacrylonitrile, methacrylonitrile, ethacrylonitrile, etc. Preferred olefinically unsaturated nitriles for use in the present invention are acrylonitrile, methacrylonitrile, and mixtures thereof.

The conjugated diene monomers which can be copolymerized with the olefinically unsaturated nitrile include 1,3-butadiene, isoprene, chloroprene, bromoprene, cyanoprene, 2,3-dimethyl-1,3-butadiene, etc. Preferred examples of conjugated diene monomers for use in the present invention include butadiene and isoprene.

The monoolefins which can be utilized in the preparation of the olefinically unsaturated nitrile copolymers may be characterized by the following Formula II

$$CH_2=C(R_3)(R_4) \qquad (II)$$

wherein $R_3$ and $R_4$ are each independently halogen or alkyl groups containing from 1 to about 7 carbon atoms. Specific examples of monoolefins of the type represented by Formula II include isobutylene, 2-methylbutene, 1-butene, 2-butene, 2-methyl-1-butene, 2-methyl-1-pentene, 2-methyl-1-hexene, 2-methyl-1-heptene, 2-methyl-1-octene, 2-ethyl-1-butene, 2-propyl-1-pentene, vinyl chloride and vinylidene chloride. The monoolefins useful in preparing the nitrile copolymers generally will not contain more than a total of 10 carbon atoms.

The olefinically unsaturated carboxylic acid esters which may be copolymerized with olefinically unsaturated nitriles and, optionally, other monomers, to form the nitrile copolymers useful in the present invention may be characterized by the following Formula III $$CH_2=C(R_1)COOR_2 \quad (III)$$

wherein $R_1$ is an alkyl group containing from 1 to about 4 carbon atoms, or a halogen atom, and $R_2$ is an alkyl group containing from 1 to about 6 carbon atoms. More often, $R_1$ will be hydrogen, or a methyl or ethyl group, and $R_2$ will be hydrogen or a methyl or ethyl group. In a preferred embodiment, $R_2$ is a methyl or ethyl group.

Specific examples of olefinically unsaturated carboxylic esters useful in the present invention include the acrylates such as methylacrylate, ethylacrylate, the propylacrylates, the butylacrylates, the amylacrylates, and the hexyl acrylates, chloroacrylate, and ethyl alpha-chloroacrylate; the methacrylates such as methyl methacrylate, ethyl methacrylate, the propyl methacrylates, the butyl methacrylates, the amyl methacrylates, and the hexyl methacrylates. Preferred esters for use in the present invention are methylacrylate, ethylacrylate, methyl methacrylate, and ethyl methacrylate.

The vinyl aromatic compounds which can be utilized in the preparation of the olefinically unsaturated nitrile copolymers useful in the present invention may be characterized by the following Formula IV $$ArCH=CH(R) \quad (IV)$$

wherein Ar is an aromatic group which may be substituted or unsubstituted and R is hydrogen or a halogen or lower alkyl group. The substituents may be alkyl groups, alkoxy groups, aryloxy groups, halogen, etc. Specific examples of vinyl aromatic compounds of the type represented by Formula IV include styrene; halogenated styrene such as o-chlorostyrene, p-iodostyrene, m-fluorostyrene, o,p-dichlorostyrene; alkyl substituted styrene such as p-methylstyrene, p-ethylstyrene, and o-tert-butylstyrene; alkoxy and aryloxy substituted styrene such as p-ethoxystyrene, p-propoxystyrene, and p-phenoxystyrne; alpha-methylstyrene; and alpha chlorostyrene.

In one preferred embodiment, the olefinic nitrile polymers are copolymers of from about 50% to about 99% by weight of an olefinically unsaturated nitrile such as represented by Formula I and from about 1% to about 50% by weight of the combination of two monomers of the types described above. Examples of such copolymers derived from three monomers include: copolymers of an olefinically unsaturated nitrile, an olefinically unsaturated ester, and a diolefin such as butadiene or isoprene; copolymers of an olefinically unsaturated nitrile, olefinically unsaturated carboxylic acid esters; and a monoolefin; copolymers of an olefinically unsaturated nitrile, an olefinically unsaturated carboxylic acid ester, and a vinylidene halide such as vinylidene chloride.

The olefinic nitrile polymers (B) which are useful in the vinyl halide polymer compositions of the present invention have been described previously in various patents. U.S. Pat. No. 3,832,335 describes a nitrile polymer composition useful in the present invention which contains from about 8 to about 69 weight percent of an olefinically unsaturated nitrile monomer, from about 8 to about 64 weight percent of vinylidene chloride, and from about 22 to about 35 weight percent of an acrylate monomer. High nitrile polymer compositions are the subject of the following patents: U.S. Pat. No. 3,891,722 describes resinous polymers which are prepared by polymerizing a mixture of at least 50% by weight of an olefinic nitrile, an olefinic ester such as ethyl acrylate or a monoolefin such as isobutylene, in an aqueous medium in the presence of a rubbery polymer of a conjugated diene. Impact-resistant polymers having low permeability to gases and vapors which are useful as the nitrile polymers (B) in the present invention also are described in U.S. Pat. No. 3,974,239 wherein polymers obtained by polymerizing an olefinic nitrile with an ester followed by polymerization with a conjugated diene monomer such as 1,3-butadiene. British Patent No. 1,279,745 also describes nitrile polymer compositions useful in the present invention. The disclosures of all of the above patents relating to olefinic nitrile polymers are hereby incorporated by reference.

High nitrile polymer compositions which are useful in the present invention also are available commercially from BP Chemicals International, Specialties Division under the general trade designations "BAREX-210" and "BAREX-218".

It often is desirable to prepare vinyl halide polymer compositions in accordance with the present invention wherein the olefinic nitrile polymer (B) which is combined, with the vinyl halide polymer (A) has a refractive index which is similar to the refractive index of the vinyl halide polymer. By combining polymers having similar refractive indices, the transparency characteristics of the resulting blend are improved while maintaining the gas barrier properties. Therefore, when selecting commercially available olefinic nitriles for preparing vinyl halide polymer compositions in accordance with the present invention and having improved transparency, the olefinic nitrile chosen should have a refractive index which is similar to the refractive index of the vinyl chloride polymer. Alternatively, when the nitrile polymers to be combined with the vinyl chloride polymers are to be prepared, the refractive index of the resulting olefinic nitrile polymer can be increased or decreased as desired while maintaining high oxygen barrier properties by varying the type and amount of acrylate, monoolefin and/or diene utilized in the formation of the olefinic nitrile copolymer. For example, if it is desired to increase the refractive index of the olefinic nitrile copolymer some of the acrylate and/or diene, and even some of the acrylonitrile may be replaced with a monomer that has a higher polymeric refractive index than the nitrile copolymer prepared in the absence of such monomer. Examples of such monomers which may increase the refractive index include styrene and vinylidene chloride. An example of a nitrile polymer with a refractive index similar to polyvinyl chloride is a copolymer of 70% acrylonitrile, 20% vinylidene chloride and 10% ethyl acrylate. It has been observed that as the refractive index of the nitrile copolymer approaches the refractive index of the polyvinyl Chloride polymer, the clarity of the resulting blend increases. Improved clarity is obtained when the difference between the refractive index of the vinyl chloride polymer and the nitrile copolymer blended therewith is less than about 0.30 units.

The following Examples illustrate the olefinic nitrile polymers useful in the compositions of the invention.

| Example | Monomers | Weight Ratio |
| --- | --- | --- |
| B-1 | acrylonitrile/methylacrylate/ 1,3-butadiene | 70/20/10 |
| B-2 | methacrylonitrile/ethylacrylate/ isoprene | 70/20/10 |
| B-4 | acrylonitrile/vinylidene chloride/ ethylacrylate | 70/20/10 |
| B-5 | methacrylonitrile/vinylidene chloride/methylmethacrylate | 55/22/23 |
| B-6 | acrylonitrile/vinylidene chloride/ ethylacrylate | 40/30/30 |

(C) Carbonyl Containing Polymers

The vinyl halide polymer compositions which comprise at least one vinyl halide polymer and at least one olefinic nitrile polymer as described above, may also contain at least one polymer containing at least one carbonyl group selected from the group consisting of

—C(O)—,

—C(O)O—,

—N—C(O)—, and

—N—C(O)O—

Examples of polymers containing these groups are polyketones, polyesters, polyamides and polyurethanes. The incorporation of the carbonyl-containing polymers (C) into the vinyl halide polymer compositions of the present invention results in an improvement in mechanical integrity of the composite and in impact properties, particularly when the vinyl halide polymer composition contains increasing amounts of the nitrile polymer (B). One particular advantageous result obtained by including the carbonyl-containing polymers (C) in the composition is that the tendency of some compositions comprising a mixture of the vinyl halide polymer (A) and the olefinic nitrile polymers (B) to delaminate is significantly reduced. In general, the carbonyl-containing copolymer (C) should be melt processable within a temperature range in which the polyvinyl chloride is typically processed. Generally, such temperatures range from about 160° C. to about 225° C. The amount of the carbonyl-containing polymer (C) included in the vinyl chloride compositions of the present invention may vary over a wide range and generally, the vinyl halide compositions may contain from about 0% to about 20% by weight of the carbonyl-containing polymer, based on the weight of the vinyl chloride polymer present in the composition. Generally amounts of from about 2% to about 15% are sufficient to provide the desired results.

The carbonyl-containing polymer (C) may be a graft copolymer of a vinyl halide or polyvinyl halide and a carbonyl-containing olefinic nitrile polymer. The graft copolymers of polyvinyl halides and carbonyl-containing olefinic nitrile polymers can be prepared by techniques well known in the art, and the relative amounts of the two polymers used in preparing the graft polymer also can be varied over a wide range to produce graft copolymers having specific characteristics. Graft copolymers comprising from 25 to 75 parts of the vinyl halide and from 25 to 75 parts of the carbonyl-containing nitrile polymer are useful, and copolymers of equal parts by weight of the polyvinyl halide and the carbonyl-containing nitrile polymer are particularly useful. The graft copolymers can be prepared from any of the vinyl halides mentioned above such as vinyl chloride, and any of the carbonyl-containing olefinically unsaturated nitriles such as the Barex materials, copolymers of acrylonitrile and methyl acrylate, etc.

The carbonyl containing polymer compositions (C) utilized in the present invention also may be graft or block copolymers of polyvinyl chloride with an ethylene-alkyl acrylate copolymer. The alkyl acrylate reacted with the ethylene to form the copolymer may be any of the alkyl acrylates of the type previously identified by Formula III although the lower alkyl acrylates such as methyl and ethyl acrylate are preferred. Copolymers of ethylene and ethylacrylate are available commercially from Union-Carbide Company. The graft or block polymers of polyvinyl chloride with the ethylene-ethylacrylate copolymer are readily prepared by polymerizing a mixture of a vinyl halide monomer such as vinyl chloride monomer and the ethylene-alkylacrylate copolymer in the presence of an initiator such as a peroxide in water. In one embodiment, a graft copolymer comprising about 50% by weight of polyvinyl chloride and about 50% by weight of the ethylene-ethylacrylate copolymer is prepared and utilized as component (C) in the compositions of the present invention.

The carbonyl-containing copolymers useful as polymer (C) in the compositions of the present invention also may be polyurethanes which are melt-processable within the range of polyvinyl chloride processing temperatures. The polyurethane polymers useful in the invention are those formed by reacting an organic diisocyanate with an active hydrogen-containing material such as polyalkylene ether glycols and hydroxy-terminated polyesters.

In the preparation of polyester-urethane elastomers, there preferably are used hydroxy-terminated polyesters prepared by polycondensation of an aliphatic dicarboxylic acid and a molar excess of an aliphatic glycol, and those prepared by ring-opening polymerization of a cyclic ester in the presence of a difunctional compound as an initiator. The polyesters obtainable by polycondensation of an aliphatic dicarboxylic acid and an aliphatic glycol are exemplified by those obtained by reaction between adipic acid, sebacic acid, maleic acid and other dicarboxylic acids with ethylene-glycol, 1,2-propylene glycol, 1,4-butylene glycol, 1,3-butylene glycol, etc. Examples of the polyesters prepared by polymerization of cyclic esters are those prepared from epsilon-caprolactone, delta-methyl-epsilon-caprolactone and beta-propiolactone in the presence of an initiator such as, for example, 1,4-butylene glycol, ethylene glycol or diethylene glycol.

The polyalkylene ether urethanes are those prepared by reacting the isocyanates with polymeric polyhydroxy compounds which include polyether polyols such as polyalkylene ether glycols, polyalkylene arylene ether-thioether glycols and polyalkylene ether triols. The polyalkylene ether glycols and triols are preferred and these include glycols having the formula $$HO(RO)_nH$$

wherein R is an alkylene radical which need not necessarily be the same in each instance, and n is an integer. Representative glycols include polyethylene ether glycol, polypropylene ether glycol and polytetramethylene ether glycol. Representative polyalkylene ether triols are made by reacting one or more alkylene oxides with one or more low molecular weight aliphatic triols. The alkylene oxides most commonly used have molecular weights between about 44 and 250 and these include ethylene oxide, propylene oxides, butylene oxides, 1,2-epoxybutane and 2,3-epoxybutane. The ethylene, propylene and butylene oxides are preferred. The ethylene, propylene and butylene oxides are preferred. The aliphatic triols most commonly used have molecular weights between about 92 and 250. Examples include glycerol, 1,2,6-hexane triol and 1,1,1-trimethylol propane.

Other active hydrogen-containing compounds which can be reacted with polyisocyanates to form urethanes useful in the invention are long-chain polymers containing at least two groups having at least one active hydrogen atom as determined by the Zerewitinoff method. Examples of such compounds include in addition to the polyesters and polymeric polyhydroxy compounds described above, polyamides, polyepoxides, reaction products of phenols and alkylene oxides, formaldehyde resins, hydrogenation products of olefin-carbon monoxide copolymers and polyepihalohydrins.

Among the suitable isocyanates that may be used in the preparation of the polyurethanes are included aryl diisocyanates such as 2,4-toluene diisocyanate (TDI), 2,6-toluene diisocyanate, 4,4'-diphenylmethane diisocyanate (MDI), 1,5-naphthylene diisocyanate and xylene-1,4-diisocyanate; alicyclic diisocyanates such as dicyclohexamethane-4,4'-diisocyanate; alkylene diisocyanate such as tetramethylene diisocyanate and hexamethylene diisocyanate; as well as mixtures thereof and including the equivalent isothiocyanates.

Chain extenders which may be utilized in the preparation of the urethanes are substantially difunctional or polyfunctional active hydrogen-containing compounds such as ethylene glycol, 1,2-propylene glycol, neopentyl glycol, dipropylene glycol, hydrazine, ethylene diamine, N,N,N',N'-tetrakis (dihydroxy propyl) ethylene diamine, etc.

Particularly useful in this invention are thermoplastic polyurethanes based on polyester polyols and diisocyanates such as MDI. Such thermoplastic polyurethanes are available commercially from the B.F. Goodrich Company under the general trade designation "Estane". For example Estane 58271 is a thermoplastic polyurethane derived from MDI and a polyester polyol obtained by the reaction of adipic acid with 1,4-butane diol, the polyester polyol having a molecular weight of about 1000. Graft copolymers of polyvinyl chloride and polyurethane prepared by milling polyvinyl chloride, a stabilizer, polyurethane and a catalyst such as a peroxide also may be utilized in the compositions of the present invention.

The following examples illustrate the preparation of various carbonyl-containing polymers useful as component (C) in the vinyl halide polymer compositions of the present invention. Unless otherwise indicated in the following examples and elsewhere in the specification and claims, all parts and percentages are by weight, all temperatures are in degrees centigrade, and pressures are at or near atmospheric.

EXAMPLE C-1

A mixture of 80 parts of a polyvinyl chloride homopolymer, 20 parts of Barex-210, 0.1 part of di-t-butyl peroxide (Triganox B), 0.25 part of stearic acid and 2 parts of a tin stabilizer is combined on a two-roll mill to produce the desired polyvinyl chloride-Barex graft copolymer. This grafted material, when pressed, has a permeability of 8.1 cc.mils/(100 in$^2$ atm 24 hr).

EXAMPLE C-2

Approximately equal parts of vinyl chloride monomer and ethylene-ethylacrylate copolymer (DPD 6169 Natural, Union Carbide) are charged to a polymerization reactor containing water and a polyvinyl alcohol dispersant. Peroxide (t-butyl peroxypivalate) is added to the suspension in the reactor, and the temperature is raised to about 60° C. whereupon polymerization begins. The polymerization reaction is continued for about 13 hours as additional vinyl chloride is added incrementally to the suspension. Incremental addition of vinyl chloride is necessary to keep the ethylene-ethylacrylate pellets from sticking together during polymerization. After about 13 hours of heating, the reaction is terminated, excess vinyl chloride is removed by steam stripping, and the pelletized product is dried. The final composition is a graft polymer comprising about 50% by weight of polyvinyl chloride and about 50% by weight of ethyleneethylacrylate copolymer.

EXAMPLE C-3

A mixture of 20 parts of polyvinyl chloride, 80 parts of polyurethane resin (Estane 58271), 2 parts of a tin stabilizer, 0.25 part of stearic acid and 0.4 part of benzoyl peroxide is milled at about 175° C. on a two-roll mill for 3 minutes. After banding, the sheet is removed and cut into cubes.

EXAMPLE C-4

The procedure of Example C-3 is repeated except that the mixture comprises 50 parts of polyvinyl chloride and 50 parts of polyurethane.

EXAMPLE C-5

The procedure of Example C-3 is repeated except that the mixture comprises 80 parts of polyvinyl chloride and 20 parts of polyurethane.

EXAMPLE C-6

A mixture of 60 parts of polyvinyl chloride, 40 parts of Estane 58271, 2 parts of tin stabilizer, 0.25 part of stearic acid and 0.1 part of catalyst (Triganox B) is milled at about 175° C on a two-roll mill. After banding, the sheet is removed and cut into cubes.

EXAMPLE C-7

A mixture of 50 parts of polyvinyl chloride homopolymer, 50 parts of Barex 210, 0.1 part of catalyst (Triganox B), 2.0 parts of a tin stabilizer, 0.1 part of oxidized polyethylene, and 0.25 part of stearic acid is milled on a two-roll mill. After banding, the sheet is removed and cut into cubes.

The vinyl halide polymer compositions of the present invention, in addition to the vinyl halide polymer (A), the olefinic nitrile polymer (B) and the optional carbonyl-containing polymer (C) generally will contain additional materials normally incorporated into vinyl chloride polymers for various purposes. For example, the vinyl halide polymer compositions may contain various additives including: impact modifiers such as methyl methacrylate-butadiene-styrene terpolymers; extrusion aids such as methyl methacrylate polymers; heat stabilizers such as dioctyl tin mercaptide and maleates; antioxidants, such as epoxidized soybean oil and hydroxy phenyl compounds; lubricants such as hydrocarbon waxes, oils, stearic acid and glycerol monostearate, ultraviolet stabilizers such as benzophenones, colorants, etc. These supplemental additives may be present at levels from 0.01% up to about 20% to about 25% by weight of the vinyl chloride polymer.

Measurements of the oxygen transmission rate are performed on 4in.×4in. samples with a maximum thickness of 0.060 inch at room temperature. One side of the sample is exposed to oxygen-free nitrogen and the other side is exposed to oxygen at atmospheric pressure An oxygen-sensitive coulometric fuel cell is used for the detection and measurement of the transmission rate of the oxygen which passes through the sample. The gas transmission rates for the vinyl halide polymer compositions of the present invention (and control examples) are reported in cubic centimeters-mils per 100 sq. inches—24 hour—atmosphere.

TABLE I

| Ingredients | Control | 1 | 2 | 3 | 4 | 5 | 6 | 7 | 8 | 9 | 10 | 11 | 12 | 13 |
|---|---|---|---|---|---|---|---|---|---|---|---|---|---|---|
| PVC Homopolymer | 500 | 500 | 500 | 500 | 500 | 500 | 500 | 500 | 500 | 500 | 500 | 500 | 500 | 450 |
| Tin Stabilizer | 11 | 11 | 11 | 11 | 11 | 11 | 11 | 11 | 11 | 11 | 11 | 11 | 11 | 11 |
| Expoxidized Soybean Oil | 2 | 2 | 2 | 2 | 2 | 2 | 2 | 2 | 2 | 2 | 2 | 2 | 2 | 2 |
| Impact Modifier | 0 | 0 | 0 | 0 | 0 | 0 | 0 | 0 | 0 | 0 | 0 | 50 | 50 | 50 |
| Processing Aids | 16.5 | 16.5 | 16.5 | 16.5 | 16.5 | 16.5 | 16.5 | 16.5 | 16.5 | 16.5 | 16.5 | 16.5 | 16.5 | 16.5 |
| Glycerol Monostearate | 3.5 | 3.5 | 3.5 | 3.5 | 3.5 | 3.5 | 3.5 | 3.5 | 3.5 | 3.5 | 3.5 | 3.5 | 3.5 | 3.5 |
| Fatty Acid Ester Lubricant | 1.25 | 1.25 | 1.25 | 1.25 | 1.25 | 1.25 | 1.25 | 1.25 | 1.25 | 1.25 | 1.25 | 1.25 | 1.25 | 1.25 |
| Oxidized Polyethylene Lubricant | 0.5 | 0.5 | 0.5 | 0.5 | 0.5 | 0.5 | 0.5 | 0.5 | 0.5 | 0.5 | 0.5 | 0.5 | 0.5 | 0.5 |
| Butylated Hydroxytoluene | 0 | 2 | 2 | 2 | 2 | 2 | 2 | 2 | 2 | 2 | 2 | 2 | 2 | 2 |
| Barex 210 | 0 | 50 | 50 | 50 | 100 | 100 | 100 | 150 | 150 | 150 | 50 | 100 | 150 | 50 |
| Estane 58271 | 0 | 10 | 0 | 0 | 20 | 0 | 0 | 30 | 0 | 0 | 0 | 0 | 0 | 0 |
| Product of Ex. C-6 | 0 | 0 | 20 | 0 | 0 | 40 | 0 | 0 | 60 | 0 | 0 | 0 | 0 | 0 |
| Product of Ex. C-7 | 0 | 0 | 0 | 20 | 0 | 0 | 40 | 0 | 0 | 60 | 20 | 40 | 60 | 0 |
| O2 Permeability | 9.1 | 8.9 | — | 5.1 | 7.1 | 7.3 | 3.5 | 3.2 | — | 2.3 | 5.0 | 3.4 | 2.6 | 5.4 |

The various components which comprise the vinyl halide polymer compositions as described above are thoroughly mixed together to form the vinyl halide composition before it is shaped into the desired article. Mixing may be accomplished by any of the customary methods known to those skilled in the art such as with a Banbury, Henshel, roll mills or other mixers.

Blending of the various components of the vinyl halide compositions can be accomplished on an extruder or a two-roll mill, and the materials can then be cut into strips, cubed and extruded on a Brabender fitted with a strip die.

The following examples illustrate the vinyl halide polymer compositions in accordance with the present invention. In each of the examples, parts are by weight, and the identified components are compounded, two-roll milled at temperatures of about 175° C., cubed and extruded. The oxygen transmission rate of the materials prepared from the vinyl halide polymer compositions of the following examples is determined utilizing the following procedure described in more detail in the Mocon/Modern Controls, Inc. manual, Mocon PN140-042, Revision E.

The vinyl halide polymer compositions of the present invention are readily processable, and the compositions are generally impact-resistant thermoplastic materials which can be thermoformed into a wide variety of useful articles by any of the methods conventionally employed with known thermoplastic polymeric materials. For example, the polymer compositions of the present invention can be formed by extrusion, milling, molding, drawing, blowing, etc. The vinyl halide polymer compositions of the present invention are characterized as having good mechanical integrity (i.e., the compositions do not delaminate), improved impact strength and low permeability to gases and vapors which make them very useful for manufacturing films, sheets, bottles and other types of containers and hollow articles for liquids and solids. Suitable methods for producing hollow articles such as bottles include extrusion-blow molding, injection-blow molding, and stretch-blow molding, and hollow articles such as bottles generally will have wall thicknesses of from about 0.005 inch to about 0.100 inch. Films from the vinyl halide polymer compositions of the present invention may be made by calendering, and films normally will have a thickness of from about 0.001 inch to about 0.100 inch.

As mentioned previously, articles may be made from the vinyl halide polymer compositions of the present invention which exhibit unusual and improved clarity. Improved clarity is obtained by selecting an olefinic nitrile polymer (B) which has a refractive index which is similar to the refractive index of the vinyl halide polymer (A). When commercial olefinic nitrile polymers are not available which meet the refractive index requirements, olefinic nitrile polymers having the desired refractive index can be designed and manufactured by varying the type and amount of monomer or monomers which are copolymerized with the olefinic nitrile monomer. For example, the refractive index of an olefinic nitrile copolymer can be increased by replacing some of the olefinic monomer with a monomer that has a higher polymeric refractive index than polyacrylonitrile. Examples of such monomers include styrene and vinylidene chloride which readily copolymerize with acrylonitrile. An example of a nitrile polymer with a refractive index similar to PVC is a terpolymer of 70% acrylonitrile, 20% vinylidene chloride and 10% ethylacrylate.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. Vinyl chloride polymer blend compositions exhibiting reduced gas permeability comprising a mixture of
   (A) at least one vinyl chloride polymer;
   (B) from about 5 to about 40 parts by weight per 100 parts of vinyl chloride polymer (A), of at least one olefinic nitrile polymer which is a copolymer of from about 50% to about 99% by weight of an olefinically unsaturated nitrile, and one or more monomers selected from the group consisting of conjugated dienes, monoolefins, olefinically unsaturated carboxylic acid esters, and vinyl aromatic compounds; and
   (C) from about 1 to about 20 parts, per 100 parts of vinyl chloride polymer, of at least one polymer selected from the group consisting of: graft copolymer of a vinyl halide and ethylene-alkyl acrylate copolymer, block copolymer of a polyvinyl halide and ethylene-alkyl acrylate copolymer, polyketone, polyester, polyamide, polyurethanes, and graft copolymer of a polyvinyl halide and a polyurethane.

2. The polymer composition of claim 1 wherein the olefinic nitrile polymer (B) is a copolymer comprising from about 60% to about 99% by weight of an olefinic nitrile having the formula $$CH_2=C(R)-CN \qquad (I)$$

wherein R represents hydrogen, a lower alkyl group containing from 1 to about 4 carbon atoms or a halogen atom; and from 1% to about 40% by weight of the combination of a conjugated diene monomer selected from the group consisting of butadiene and isoprene; and an ester of an olefinically unsaturated carboxylic acid having the formula $$CH_2=C(R_1)COOR_2 \qquad (III)$$

wherein $R_1$ is an alkyl group containing from 1 to about 4 carbon atoms or a halogen atom, and $R_2$ is an alkyl group containing from 1 to about 6 carbon atoms.

3. The polymer composition of claim 1 wherein the olefinic nitrile polymer (B) is a copolymer of acrylonitrile, methylacrylate and a diene monomer selected from butadiene and isoprene.

4. The polymer composition of claim 3 wherein the olefinic nitrile polymer (B) comprises from about 70% to about 90% by weight of acrylonitrile based on the combined weight of the acrylonitrile and methyl acrylate; and from about 1 to about 40 parts by weight of the diene monomer per 100 parts by weight of the combined weight of acrylonitrile, methyl acrylate and diene monomer.

5. The polymer composition of claim 4 wherein the diene monomer is butadiene.

6. The vinyl halide polymer composition of claim 1 wherein the olefinic nitrile polymer (B) is a copolymer of an olefinically unsaturated nitrile monomer, a vinylidene chloride, and at least one olefinically unsaturated carboxylic ester.

7. The vinyl halide polymer composition of claim 6 wherein the carboxylic ester is a methyl or ethyl acrylate or methacrylate.

8. The polymer composition of claim 1 wherein in the refractive index of the olefinic nitrile polymer (B) is similar to the refractive index of the vinyl halide polymer (A).

9. A film of the vinyl halide polymer composition of claim 1.

10. Packaging films, sheets and hollow articles fabricated from the composition of claim 1.

* * * * *